United States Patent
Wang et al.

(10) Patent No.: US 8,560,607 B2
(45) Date of Patent: Oct. 15, 2013

(54) METHOD BASED ON THE COMBINATION OF THE UPNP AND STUN FOR NAT TRAVERSAL

(75) Inventors: Jinlin Wang, Beijing (CN); Hao Ren, Beijing (CN); Yifeng Lu, Beijing (CN); Shaowei Su, Beijing (CN); Zhentan Feng, Beijing (CN)

(73) Assignee: Institute of Acoustics, Chinese Academy of Science, Beijing (CN)

( * ) Notice: Subject to any disclaimer, the term of this patent is extended or adjusted under 35 U.S.C. 154(b) by 303 days.

(21) Appl. No.: 12/937,337

(22) PCT Filed: May 3, 2009

(86) PCT No.: PCT/CN2009/000235
§ 371 (c)(1),
(2), (4) Date: Jan. 3, 2011

(87) PCT Pub. No.: WO2009/124450
PCT Pub. Date: Oct. 15, 2009

(65) Prior Publication Data
US 2011/0264739 A1    Oct. 27, 2011

(30) Foreign Application Priority Data
Apr. 11, 2008   (CN) .............................. 200810103849

(51) Int. Cl.
*G06F 15/16*      (2006.01)
*G06F 15/177*     (2006.01)

(52) U.S. Cl.
USPC .......................................... 709/204; 709/220

(58) Field of Classification Search
USPC ................................................ 709/204, 220
See application file for complete search history.

(56) References Cited

U.S. PATENT DOCUMENTS 8,077,602 B2 * 12/2011 Arimilli et al. ............... 370/217
2002/0143855 A1 * 10/2002 Traversat et al. ............. 709/202
(Continued)

FOREIGN PATENT DOCUMENTS

| CN | 1976356 | 6/2007 |
|----|---------|--------|
| CN | 1859314 | 6/2008 |
| JP | 2007-096554 | 4/2007 |

OTHER PUBLICATIONS

Ren et al., "Research Combination of UP nP and STUN for NAT Traversal", Computer Engineering and Applications, vol. 45(2), 2009, pp. 99-101 (english abstract).

*Primary Examiner* — Abdullah Riyami
*Assistant Examiner* — Brian Cox
(74) *Attorney, Agent, or Firm* — Davis Wright Tremaine LLP (57) ABSTRACT

The present invention relates to a method based on the combination of UPnP and STUN for NAT traversal. The method of the present invention effectively takes the advantages of UPnP and STUN. In particularly, when UpnP fails to traverse NAT, STUN is applied to perform the NAT traversal for the second time, so that the efficiency of the successful traversal is effectively improved. For the symmetric NAT traversal, a Port-Adding Sample Estimation method based on NAT adding port mapping is provided for port estimation, to avoid the defects resulted from the third-party agent and the blindness of the speculation approach. And, where both of the communication peers in the P2P streaming media system are behind NAT, the method that the part of the ordinary outer peers with the sufficient bandwidth acts as the Auxiliary-Relay peers is provided to release the pressure of the relay server so that the bottle-neck of the communication is broken through.

3 Claims, 4 Drawing Sheets

(56) References Cited

U.S. PATENT DOCUMENTS

| | | | |
|---|---|---|---|
| 2004/0249907 A1* | 12/2004 | Brubacher et al. | 709/220 |
| 2005/0105543 A1 | 5/2005 | Ikenaga et al. | |
| 2006/0242227 A1* | 10/2006 | Rao et al. | 709/203 |
| 2007/0239819 A1* | 10/2007 | Woods et al. | 709/201 |
| 2008/0165786 A1* | 7/2008 | Ahuja et al. | 370/395.2 |
| 2008/0198850 A1* | 8/2008 | Cooper et al. | 370/392 |
| 2008/0288580 A1* | 11/2008 | Wang et al. | 709/203 |
| 2009/0006648 A1* | 1/2009 | Gopalakrishnan et al. | 709/245 |
| 2009/0106394 A1* | 4/2009 | Lin et al. | 709/218 |
| 2009/0316687 A1* | 12/2009 | Kruppa | 370/352 |
| 2010/0146126 A1* | 6/2010 | Lin et al. | 709/228 |

* cited by examiner

METHOD BASED ON THE COMBINATION OF THE UPNP AND STUN FOR NAT TRAVERSAL

CROSS-REFERENCE TO RELATED APPLICATIONS

This application claims priority to Chinese patent application no. 200810103849.6, filed on Apr. 11, 2008, titled, A Method Based on the Combination of UPnP and STUN for NAT Traversal which is incorporated herein by reference in its entirety.

BACKGROUND OF THE INVENTION

Technology Field

The present invention relates to computer networks, P2P streaming media technology, in particular, deals with a method based on the combination of UPnP and STUN for NAT Traversal.

With the development of the Internet and the popularity of broadband applications, the network streaming media broadcast with network is becoming a hot of the network application. For the traditional streaming media system based on the client/server system architecture, its limitations of the bandwidth and processing power result in the poor scalability. Peer-to-peer technology as an effective solution has been greatly promoted in recent years. In P2P mode, because each node has both the functions of the client and the server, and the nodes will send and receive data simultaneously, the burden of the streaming media server will be reduced greatly with use of the client nodes' upload bandwidth.

On the other hand, considering of saving the network address space and guaranteeing the network security, NAT (Network Address Translation) technology is widely used. It's a method of mapping IP address from one domain to another domain. NAT devices can implement Dynamic IP Address Translation and set the corresponding packet filtering rules for each network connection between the inner network addressing domain and the outer network addressing domain.

NAT can be a good support for basic Internet applications, such as browsing the web page. For the application protocols which are implemented on fixed port such as HTTP, traversing is realized just by the conversion of TCP/UDP header. However, it is difficult to support P2P streaming media applications for following reasons:

(1) NAT's characteristics determine that connection can only be initiated from inner peer to the outer peer, and the direct connection from the outer peer to the inner peer is not allowed. It means that when the outer peer requests the media data from the inner peer, they aren't connected, so that the data couldn't be exchanged between them.

NAT port mapping includes the static and dynamic types, wherein for the static mapping, the port-mapping is added statically between ($IP_{inner}$, $Port_{inner}$) and ($IP_{outer}$, $Port_{outer}$) is added for each session (outer); and for the dynamic mapping, the port-mapping established between the outer and inner peers couldn't secure the same session for the same conversation. The communication port used in P2P streaming media communication system between peers is dynamically negotiated when establishing connections, so that none of the mapping methods could satisfy with the demand of dynamically communications between peers for the P2P streaming media communication system.

Therefore, the issue of crossing the NAT must be resolved to some extent for the P2P streaming media applications, otherwise the system will not work correctly.

BRIEF SUMMARY OF THE INVENTION

The purpose of the present invention is to solve the above problem. The present invention overcomes the disadvantages of the conventional technology and presents a method based on the combination of UPnP and STUN for NAT traversal. The said method effectively combines the above traversal methods to secure the success of NAT traversal. A Port-Adding Sample Estimation method based on NAT adding port mapping is proposed for port estimation for the symmetric NAT traversal to overcome the defects resulted from the third-party agent and the blindness of the speculation approach. Where both of the communication peers in the P2P streaming media system are behind NAT, the Peer Auxiliary-Relay method which the part of the outer ordinary communication peers with the sufficient bandwidth act as the Auxiliary-Relay peers is proposed to release pressure of the relay server, so that the bottle-neck of the communication is broken.

BRIEF DESCRIPTION OF THE PREFERRED EMBODIMENT

The present invention provides a NAT traversal method combining UPnP with STUN effectively, wherein STUN is applied to traverse NAT for the second time when UPnP fails to traverse NAT, so that the efficiency of the successful traversal is improved by taking their advantage.

Figure 1:
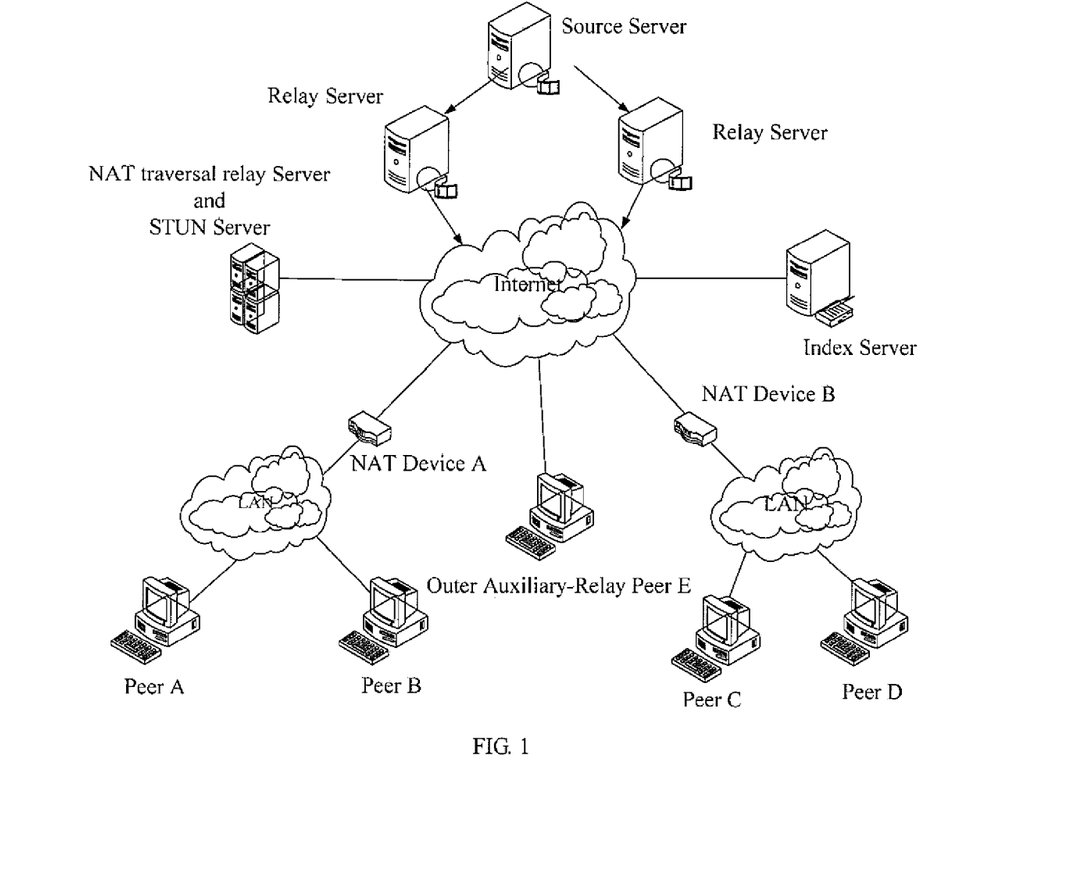
FIG. 1 shows the architecture of the P2P Streaming Media System with the conventional NAT.

The architecture of the P2P streaming media system with NAT is shown in FIG. 1. The source server and the relay server are in charge of flowing and forwarding data. The index server as the central index server of the P2P web in its domain keeps the information of all the peers of the P2P web in this domain. The peers A and B are located in the same LAN behind the NAT device A, the peers C and D are located in another LAN behind the NAT device B, and the peer E is a outer peer.

In the case that the peer E requests the data from the peer A, the connection will be rejected because of NAT, and the data request of the peer E will be filtered out by the NAT device A so that the peer A will perform NAT traversal.

Figure 2:
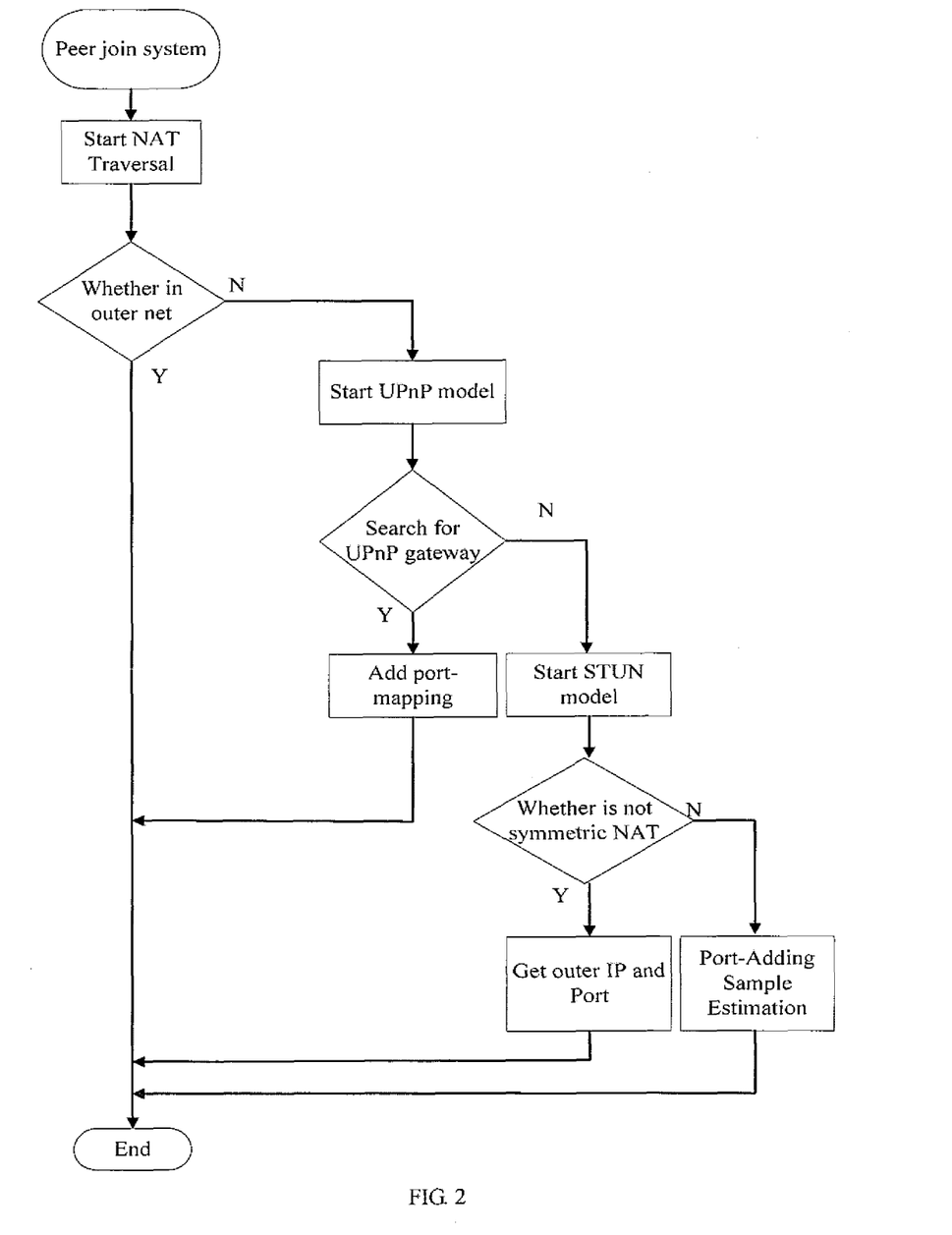
FIG. 2 shows the flow chart of the method based on the UPnP and STUN for NAT traversal of the present invention.
Figure 3:
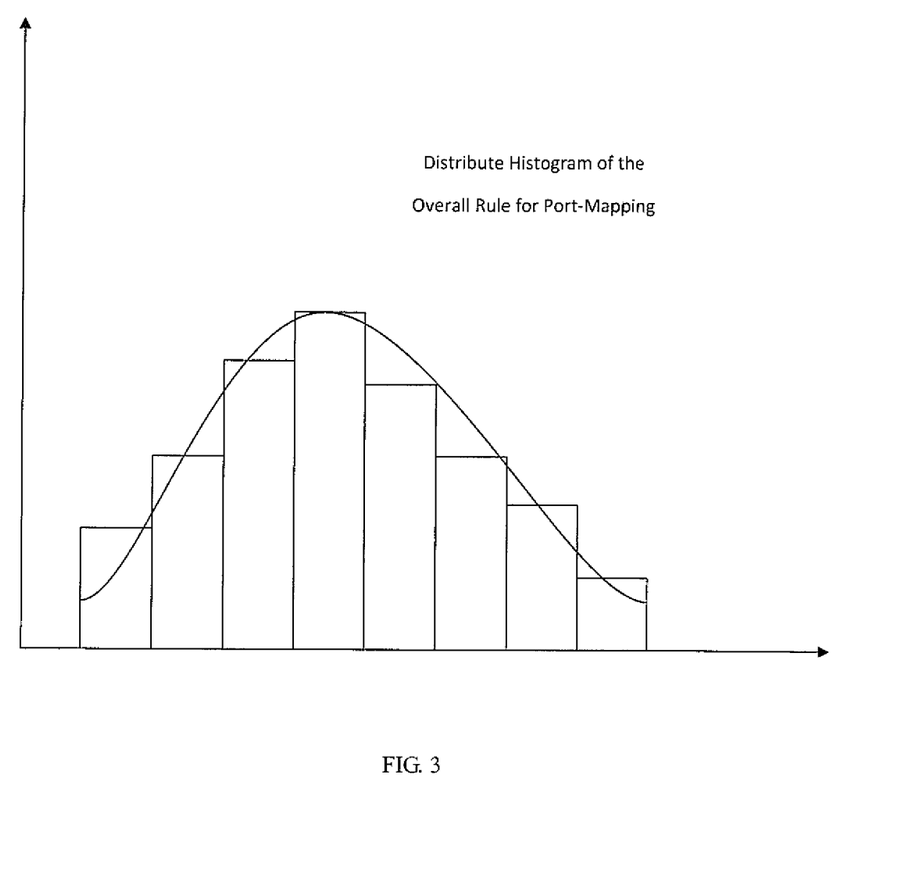
FIG. 3 shows an example of the sample distribution histogram obtained by the Port-Adding Sample Estimation method of the present invention.
Figure 4:
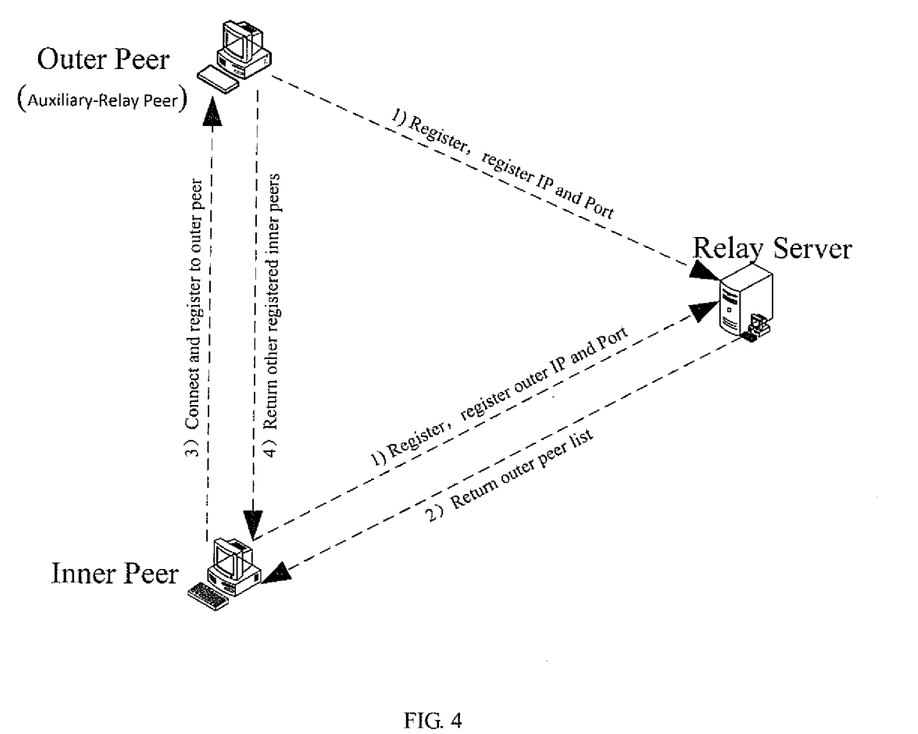
FIG. 4 shows the flow chart of the Peer Auxiliary-Relay method of the present invention.

According to the method of the present invention, as shown in FIG. 2, the peer A will add port-mapping by UPnP at first, and then if succeeding, would be connected to the peer E, which comprises the following steps:

(1) the peer A just joining into the P2P streaming media system broadcast-searches the message of the UPnP device in internal net by SSDP protocol:

void Search(char* name, const char* type);
  wherein according to the requirement of the UPnP standard the parameter name is "WANIPConnection" and the parameter type is "service";
  (2) if searching succeeds, the peer A sends the Port-Adding mapping message to the NAT gateway control URL by the SOAP protocol:
void InvokeCommand (char* name, char* args);
  wherein the parameter name is control command "AddPortMapping" to UPnP device, and args is the several other parameter required by the UPnP standard, so that the inner peer A can connect with the outer peer E to communicate, and the NAT is realized; and
  if searching fails, the peer A initiates STUN model to perform NAT traversal for the second time:
void GetMapAddr (int& extIP, int& extPort, NatType& natType), wherein the parameters extIP and extPort are the outer IP and Port obtained by STUN, and the parameter natType is the type of NAT.
  The said step (3) further comprises
  1) if NAT is Cone NAT, the said inner peer A can communicate with the outer peer E with the obtained outer IP and Port, so that NAT traversal is realized;
  2) if NAT is symmetric NAT, the peer A realizes NAT traversal by Port-Adding Sample Estimation method which includes the steps as follow:
  the peer A behind the symmetric NAT sends three connections to STUN Server in the outer internet in order and the server feeds back the mapping ports added by three connections which are set into $P_1$, $P_2$ and $P_3$, then the peer A works as follow according to their change,
  2a) if $P_1$, $P_2$ and $P_3$ are the arithmetical progression, it's speculated that the way that the symmetric NAT adds port-mapping is to increase the original port in the tolerance d in order, so that the peer A behind the symmetric NAT can communicate with the peer E by adding the tolerance d to the original outer port as its new outer communication port and filling it into the load of the data exchange; and
  2b) if $P_1$, $P_2$ and $P_3$ are not arithmetical progression, the symmetric NAT adds port-mapping randomly, and the Peer estimates the overall rule for port mapping according to the sample of port-adding as follow:
  the peer A sends the N−3 connections again to the STUN server, constituting the sample observations with the sample size of N together with three former mapping ports, and the sample observations are set within the interval [a, b] divided into M sub-intervals (M<N), $$a=n_0<n_1<\ldots<n_{M-1}<n_M=b$$

wherein each sub-interval $(n_i, n_{i+1}]$ (i=0, 1, ..., M−1) includes $t_i$ observations, and the following formula is obtained based on Bernoulli law of large numbers and definition of probability density:

$$\phi_N(x)=t_i/N\Delta n_i (\Delta n_i=n_{i+1}-n_i)$$

wherein the graph of $\phi_N(x)$ is the distribution histogram of the overall rule for port-mapping over [a, b] (as shown in FIG. 3), the sub-interval in which the NAT mapping ports distributes can be determined by observing the interval $\Delta n_i$ with the relative high the value of $\phi_N(x)$, and the next port-mapping added by the symmetrical NAT is estimated by Ergodic way in the said sub-interval, so that the estimation efficiency is effectively improved. In case that the peer A makes a request for the data from C, the connection can't be established because they are behind NAT, so that the Peer Auxiliary-Relay method of the present invention in which the outer peer E will serve as the Auxiliary-Relay peer to transmit forward their connection request is applied as follow:
  1) the outer peer E joining into the P2P streaming media system will register with the relay server at first and the said relay server would keep a copy of list including the outer peer E,
  2) when the inner peer A registers with relay server, the relay server keeps the information of the peer A while transmitting a list of outer peers including the peer E to the peer A,
  3) then the inner peer A selects the peer E with the smallest RTT as its Auxiliary-Relay peer, while sending the registering information to it, and
  4) when communicating with the other peers behind NAT such as the peers C and D, firstly, it will query the registering list of its own Auxiliary-Relay peer E, if the peers C or D is in the list, the said Auxiliary-Relay peer E will serve as the relay server, otherwise the relay server will do so that the pressure of NAT traversing relay server will be reduced when many of the other peers establish the connection, as shown in FIG. 4.
  To achieve the above purposes as noted in the BRIEF SUMMARY OF THE INVENTION, the method based on the combination of UPnP and STUN for NAT traversal of the present invention includes the following steps:
  (1) the peer joining into the P2P streaming media system broadcast-searches the message for UPnP device in internal net by the SSDP protocol:
void Search(char* name, const char* type);
  wherein, according to the requirement of the UPnP standard, the parameter name is "WANIPConnection" and the parameter type is "service";
  (1) if the service of searching UPnP succeeds, the Port-Adding mapping message is sent to NAT gateway control URL by the SOAP protocol:
void InvokeCommand(char* name, char* args);
  wherein the parameter name is the control command "AddPortMapping" to the UPnP device, and args is the several parameters required by the UPnP standard, so that after two steps the inner peer can communicate with the outer peer to exchange the data, and NAT traversal is realized; and
  (2) if searching fails, the peer initiates STUN model to perform NAT traversal for the second time:
void GetMapAddr(int& extIP, int& extPort, NatType& natType);
  wherein the parameters extIP and extPort are the NAT outer IP and port obtained by STUN, and the parameter natType is the type of NAT judged during traversing.
  According the method of the present invention, wherein the said step (3) further comprises:
  1) if NAT is Cone NAT, the inner peer communicates with other peers by the outer IP and Port obtained by STUN, to realize NAT traversal; and
  2) if NAT is symmetric NAT, the peer realizes NAT traversal with Port-Adding Sample Estimation method, which includes the following steps:
  the peer behind the symmetric NAT sends three connections to the STUN Server in the outer internet in order and the server feeds back three mapping ports added by three connections, which are set into $P_1$, $P_2$, and $P_3$, then the peer works as follow according to their changes,
  2a) if $P_1$, $P_2$ and $P_3$ are the arithmetical progression, the way the symmetric NAT adds the port-mapping is to increase the original port in the tolerance d in order, so that the peer behind the symmetric NAT can communicate with the other peer by adding the tolerance d to the original outer port as its new outer communication port and filling it into the load of data exchange; and 2b) if $P_1$, $P_2$ and $P_3$ are not arithmetical progression, the symmetric NAT adds the port-mapping randomly, and the peer estimates the overall rule for port-mapping according to the sample of port-adding, the peer behind symmetric NAT sends the N−3 connections again to the STUN server, to constitute the sample observations with the sample size of N together with three former mapping-ports, and the sample observations are set within the interval [a, b] divided into M sub-intervals (M<N), wherein $a=n_0<n_1<\ldots<n_{M-1}<n_M=b$ assuming that each sub-interval $(n_i, n_{i+1})$ (i=0, 1, ..., M−1) includes $t_i$ observations, the following formula is obtained based on Bernoulli law of large numbers and definition of probability density, $\phi_N(x)=t_i/N\Delta n_i$ $(\Delta n_i=n_{i+1}-n_i)$, wherein the graph of $\phi_N(x)$ is the distribution histogram of the overall rule for port-mapping over [a, b], and the sub-interval in which the NAT mapping port distributes can be determined by observing the $\Delta n_i$ with the relative high $\phi_N(x)$ graph value, followed by speculating the next port-mapping added by symmetrical NAT by Ergodic way in the said sub-interval.

According to present invention, the said method based on the combination of UPnP and STUN for NAT traversal further comprises the Peer Auxiliary-Relay method. If both of the communication peers in the P2P streaming media system are behind NAT, the inner peer takes the part of the outer ordinary communication peers with the sufficient bandwidth as the auxiliary relay peer to alleviate the pressure of relay server (i.e. Peer Auxiliary-Relay method).

According to the method of the present invention, the said Peer Auxiliary-Relay method comprises the following steps:

1) the outer peers which have joined into the P2P streaming media system registers with the relay server at first and the relay server will keep a list of the outer peers;

2) the relay server will probe all the registered outer peers with the heartbeat mechanism and select the M outer peers with the smallest RTT as the candidate of the auxiliary relay peers;

3) the inner peer registers with the relay server, and at the time of registering, the relay server sends one list of the outer peers to the inner peer;

4) the inner peer randomly choose the N (N<M) outer peers to connect, and selects the peer with the smallest RTT as its auxiliary relay peer while sending the register information to the said auxiliary relay peer; and 5) at the time of determining its own auxiliary relay peer, the inner peer obtains the information of the other inner peers registered on this peer, so that when communicating with other peers behind NAT, the inner peer will query the registering list of its auxiliary relay peer at first, wherein if the peer to be communicated is listed, the said outer auxiliary relay peer will be used to establish connection, otherwise the relay server will be used.

The advantages of the present invention are as follow:

1. The method of the present invention takes the advantages of UPnP and STUN by effectively combining them. Particularly, NAT traversal is performed for the second time by STUN when UpnP fails to traverse NAT, so that the efficiency of the successful traversal is effectively improved.

2. The Port-Adding Sample Estimation method based on NAT adding port mapping is provided to estimate the port for the symmetric NAT traversal to overcome the defects resulted from the third-party agent and the blindness of the speculation approach.

3. Where both of the communicating peers are behind NAT, the Peer Auxiliary-Relay method which the part of the ordinary communication outer peers with the sufficient bandwidth acts as the Auxiliary-Relay peers is provided to release the pressure of the relay server, so that the bottle-neck of the communication is broken.

The invention claimed is:

1. A method based on the combination of UPnP and STUN technology for NAT traversal, including the steps of:
  (1) a user peer joining into a peer-to-peer streaming media system broadcast-searching process a message of UPnP devices in an internal net by SSDP protocol:
  (2) if the broadcast-searching process succeeds, sending a request for adding port-mapping to a control URL of a NAT gateway by SOAP protocol, and after the port-mapping is added, the user peer is connected with an outer peer for data communication, thereby realizing NAT traversal; and
  (3) if the broadcast-searching process fails, the user peer initiating STUN function model to perform NAT traversal for the second time, wherein said step (3) further including:
  (1) if the NAT is a cone-shaped NAT, the user peer communicating with other peers through obtained outer address port to realize NAT traversal;
  (2) if the NAT is a symmetric NAT, the user peer performing NAT traversal by using port-adding sample estimation method, wherein the said port-adding sample estimation method including the following steps:

the user peer behind the symmetric NAT initiating three connections to a STUN server in outer web in order, and obtaining mapped ports $P_1$, $P_2$ and $P_3$ added by the three connections fed back by the STUN server, and then the user peer performing the following processing based on a feature of the three ports $P_1$, $P_2$ and $P_3$, 2a) if $P_1$, $P_2$ and $P_3$ are an arithmetical progression, then the symmetric NAT adds port-mapping by increasing the original port by the common difference d of the arithmetical progression in order, so that the user peer behind the symmetric NAT communicates with the other peers by adding the common difference d to its original outer port as its new outer port and by filling itself into a load of the data communication, and 2b) if $P_1$, $P_2$ and $P_3$ are not an arithmetical progression, the symmetric NAT adds port-mapping randomly, and the user peer estimates the overall rule for port-mapping according to the samples of port-adding, the user peer behind the symmetric NAT initiates N−3 connections again to the STUN server, so as to constitute sample observation values with a size of N together with the three previously obtained mapped ports, wherein assuming sample observation values are in the interval [a, b] and dividing the interval [a, b] into M sub-intervals (M<N), and wherein $a=n_0<n_1<\ldots<n_{M-1}<n_M$, assuming each sub-interval $(n_i, n_{i+1})$ (i=0, 1, ..., M−1) includes $t_i$ observation values, then based on Bernoulli law of large numbers and definition of probability density, the following formula is obtained:

$\phi_N(x)=t_i/N\Delta n_i(\Delta n_i=n_{i+1}-n_i)$, wherein a graph of $\phi_N(x)$ is a distribution histogram of the overall rule for port-mapping over the interval [a, b], and
  a sub-interval over which the mapped ports of the NAT distribute can be determined by observing the interval $\Delta n_i$ with the relative high value of $\phi_N(x)$, and then the next port-mapping to be added during next communication by the symmetrical NAT is speculated in ergodic way in the sub-interval, so as to improve speculating efficiency.

2. The method based on the combination of UPnP and STUN for NAT traversal according to the claim 1, further including a peer auxiliary relay method,
wherein if both of the user peer and the outer peer in the peer-to-peer streaming media system are behind NAT, the user peer will take some ordinary peers in an outer web with sufficient bandwidth as its auxiliary relay peers.

3. The method based on the combination of UPnP and STUN for NAT traversal according to the claim 2, wherein the peer auxiliary relay method further including:
1) outer peers which have joined into the peer-to-peer streaming media system register with a relay server at first and the relay server keeps a list of the outer peers;
2) the relay server probes all of the registered outer peers with heartbeat mechanism and selects a number of M outer peers with the smallest RTT as candidates of the auxiliary relay peers;
3) the user peer registers with the relay server, and at the time of registering the user peer the relay server transmits the list of the outer peers to the user peer;
4) the user peer randomly chooses a number of N (N<M) outer peers to establish connections, and selects one outer peer with the smallest RTT as its auxiliary relay peer while sending registering information to said auxiliary relay peer; and
5) at the same time of determining its own auxiliary relay peer, the user peer obtains information of the peers registered on a registering list of its auxiliary relay peer, so that when communicating with other peers behind NAT, the user peer queries the registering list of its auxiliary relay peer at first, and if the outer peer to communicate with is on the list, the said auxiliary relay peer is used as a relay peer, otherwise the relay server is used.

* * * * *

UNITED STATES PATENT AND TRADEMARK OFFICE
CERTIFICATE OF CORRECTION

| | | |
|---|---|---|
| PATENT NO. | : 8,560,607 B2 | Page 1 of 1 |
| APPLICATION NO. | : 12/937337 | |
| DATED | : October 15, 2013 | |
| INVENTOR(S) | : Wang et al. | |

It is certified that error appears in the above-identified patent and that said Letters Patent is hereby corrected as shown below:

On the title page, item (22), PCT Filing date, please delete "May 3, 2009," and insert -- March 5, 2009. --

Signed and Sealed this
First Day of April, 2014

Michelle K. Lee
*Deputy Director of the United States Patent and Trademark Office*